(12) United States Patent
Park

(10) Patent No.: US 8,609,272 B2
(45) Date of Patent: Dec. 17, 2013

(54) SECONDARY BATTERY WITH FINISHING TAPES

(75) Inventor: Joung-Hwan Park, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 626 days.

(21) Appl. No.: 12/458,207

(22) Filed: Jul. 2, 2009

(65) Prior Publication Data
US 2010/0035132 A1 Feb. 11, 2010

(30) Foreign Application Priority Data
Aug. 6, 2008 (KR) .................. 10-2008-0076981

(51) Int. Cl.
*H01M 2/14* (2006.01)
(52) U.S. Cl.
USPC ............................ 429/131; 429/129; 429/133
(58) Field of Classification Search
USPC ......................... 429/129, 131, 133
See application file for complete search history.

(56) References Cited

U.S. PATENT DOCUMENTS

| 2003/0087150 | A1* | 5/2003 | Chung | 429/129 |
| 2006/0269838 | A1* | 11/2006 | Song et al. | 429/174 |
| 2007/0154787 | A1* | 7/2007 | Jang et al. | 429/94 |

FOREIGN PATENT DOCUMENTS

| JP | 06150971 | 5/1994 |
| JP | 2001307759 | 11/2001 |
| JP | 2005243336 | 9/2005 |
| KR | 10200772451 A | 7/2007 |
| KR | 10200835226 A | 4/2008 |

* cited by examiner

*Primary Examiner* — Zachary Best
(74) *Attorney, Agent, or Firm* — Robert E. Bushnell, Esq.

(57) ABSTRACT

A secondary battery includes an electrode assembly in which a first electrode plate, a separator, and a second electrode assembly are sequentially stacked forming a stack and is wound about one edge of the stack, and a plurality of finishing tapes attached to the outer surface of the electrode assembly and spaced apart from each other along the winding direction of the electrode assembly.

20 Claims, 6 Drawing Sheets

SECONDARY BATTERY WITH FINISHING TAPES

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on the 6 Aug. 2008 and there duly assigned Serial No. 10-2008-0076981.

BACKGROUND OF THE INVENTION

1. Field of the Invention

The present invention relates to a secondary battery, and more particularly to, a secondary battery having an electrode assembly on which finishing tapes forming passages are attached.

2. Description of the Related Art

Lithium secondary batteries are classified, according to their electrolytes, into lithium ion secondary batteries using liquid electrolytes and lithium polymer batteries using polymer electrolytes. A lithium ion secondary battery is manufactured by sealing a jelly-roll type electrode assembly, which is a power generation source, with a can or a pouch type cover, and then by injecting an electrolyte inside the cover. In particular, in the lithium ion secondary battery using a can as the cover, after an electrolyte is injected through an injection hole formed in the cover, the injection hole is closed. For a normal operation of the battery, it is necessary to completely fill electrolyte in the electrode assembly.

Lithium ion secondary batteries are also classified according to their shapes, which includes cylinder type batteries and rectangular plate-like square type batteries. A jelly-roll type electrode assembly is wound such that two electrode plates and two separators are alternately disposed. A finishing tape is attached around the outer surface of the electrode assembly so that the electrode assembly cannot be loosened.

However, this type of structure of an electrode assembly around which a finishing tape is attached has the following shortcomings.

First, it hampers smooth filling of the electrolyte. In other words, the finishing tape, which is attached to the entire outer surface of the electrode assembly, impedes the flow of the electrolyte downward inside the can during injection of the electrolyte. Accordingly, the electrolyte is likely to be filled only at an upper portion of the electrode assembly, increasing process time and lowering productivity.

Second, it prevents radiation of heat. A large amount of heat is generated in the electrode assembly during charge and discharge processes of the battery, and the finishing tape attached to the entire surface of the electrode assembly prevents dissipation of the heat through the surface of the electrode assembly.

Third, it causes deformation of the battery. The electrode assembly expands during discharge of the battery. In this case, the finishing tape attached to the entire surface of the electrode assembly excessively presses the electrode assembly, abnormally deforming the shape of the battery.

SUMMARY OF THE INVENTION

The present invention has been made to solve the above problems, and the present invention provides a secondary battery in which a filling rate of an electrolyte is improved. The present invention also provides a secondary battery in which radiation of heat is improved. The present invention also provides a secondary battery whose shape cannot be easily distorted.

In accordance with an exemplary embodiment of the present invention, there is provided a secondary battery including: an electrode assembly in which a first electrode plate, a separator, and a second electrode assembly are sequentially stacked forming a stack and the stack is wound about a first edge of the stack; and a plurality of finishing tapes attached to an outer surface of the electrode assembly and spaced apart from each other along a direction substantially perpendicular to the first edge.

Passages may be formed between two of the finishing tapes, and total widths of the passages may be equal to or more than 3% of a circumference of the electrode assembly.

The passages may extend from an upper end of the electrode assembly, which is substantially perpendicular to the first edge, to a lower end of the electrode assembly, which is substantially perpendicular to the first edge.

At least one of the finishing tapes may cover a second edge of the stack of the electrode assembly.

The outer surface of the electrode assembly may include a front surface, a rear surface, a first side surface, and a second side surface. The first and the second side surfaces connect the front surface to the rear surface. Each of the front surface and the rear surface has a width wider than a width of each of the first side surface and the second side surface so that the electrode assembly has a thin plate-like shape. The second edge of the stack of the electrode assembly may be located on the front surface. The plurality of the finishing tapes may include at least four finishing tapes. A first one of the finishing tapes is attached on the front surface of the electrode assembly, a second one of the finishing tapes on the rear surface of the electrode assembly, a third one of the finishing tapes on the first side surface of the electrode assembly, and a fourth one of the finishing tapes on the second side surface of the electrode assembly.

The electrode assembly may include a first electrode tab attached to the first electrode plate and a second electrode tab attached to the second electrode plate.

The secondary battery may further include a can housing the electrode assembly.

The plurality of finishing tapes may contact side walls of the can.

The secondary battery may further include an insulation case disposed inside the can. The insulation case may include a bottom plate covering an upper portion of the electrode assembly. The bottom plate of the insulation plate has a passage hole through which electrolyte is injected.

An upper end of at least one of finishing tapes, which is substantially perpendicular to the first edge, may be spaced apart from an upper end of the electrode assembly, which is substantially perpendicular to the first edge.

A lower end of the at least one of finishing tapes, which is substantially perpendicular to the first edge, may be spaced apart from a lower end of the electrode assembly, which is substantially perpendicular to the first edge.

The finishing tapes may be made of polyethylene (PE), polyphenylene ether (PPE), polyimide (PI), polypropylene (PP), or polyethylene terephthalate (PET).

In another aspect of the present invention, there is provided a secondary battery including an electrode assembly in which a first electrode plate, a separator, and a second electrode plate are sequentially stacked forming a stack and the stack is wound about a first edge of the stack, and a plurality of finishing tapes attached to an outer surface of the electrode assembly and spaced apart from each other. An upper end of at least one of finishing tapes, which is substantially perpendicular to the first edge, is substantially the same level as an upper end of the electrode assembly, which is substantially perpendicular to the first edge.

A lower end of the at least one of the finishing tapes, which is substantially perpendicular to the first edge, may be substantially the same level as a lower end of the electrode assembly, which is substantially perpendicular to the first edge.

The above-mentioned secondary battery can accomplish the objects of the present invention. In particular, since separation spaces are formed between several finishing tapes, an electrolyte can rapidly move downward during injection of the electrolyte, thereby making the filling rate of the electrolyte quicker and improving the productivity of the battery. Further, since heat is radiated through the separation spaces formed between several finishing tapes, the stability of the battery is improved. Furthermore, since the finishing tapes are spaced apart by the separation spaces, the pressure applied to the electrode assembly is reduced, reducing the deformation of the electrode assembly.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
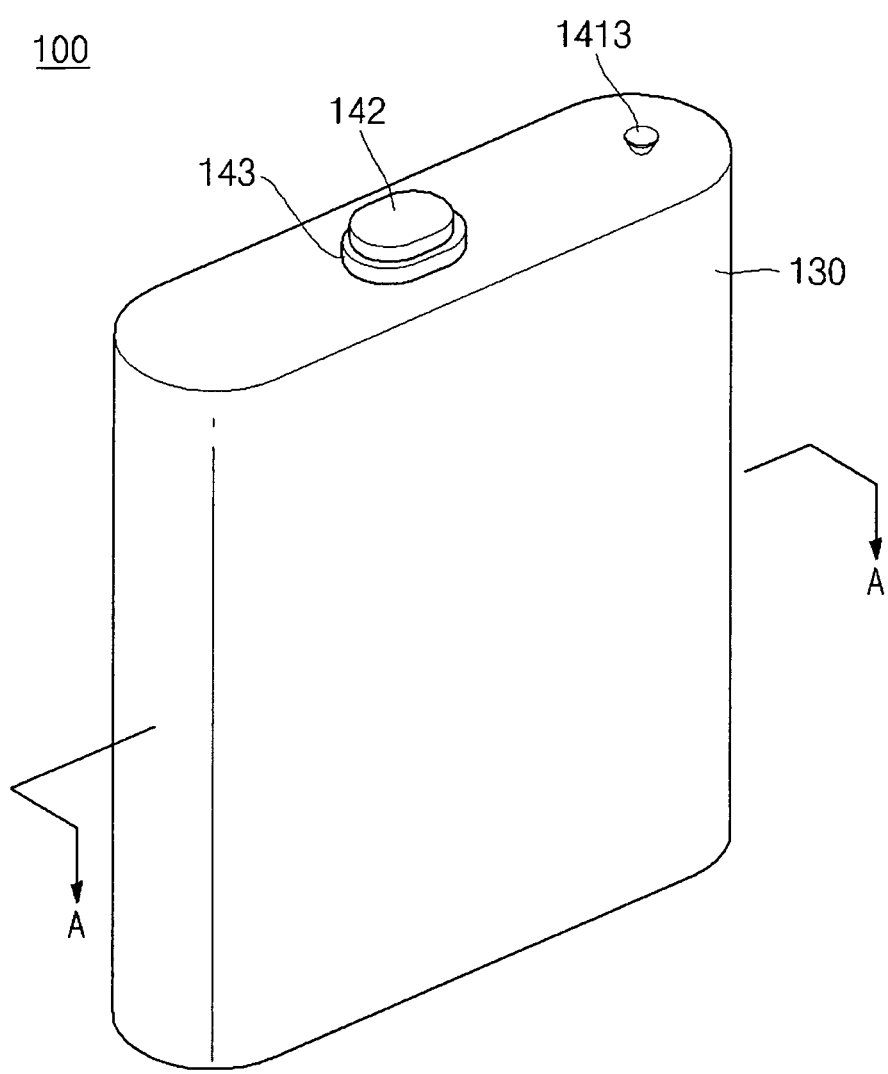
FIG. 1 is a perspective view of a square type lithium ion secondary battery according to an embodiment of the present invention.

Hereinafter, embodiments of the present invention will be described in detail with reference to the accompanying drawings. The same reference numerals are used throughout the drawings to refer to the same or like elements. Detailed descriptions of well-known functions and structures incorporated herein may be omitted to avoid obscuring the subject matter of the present invention.

Figure 2:
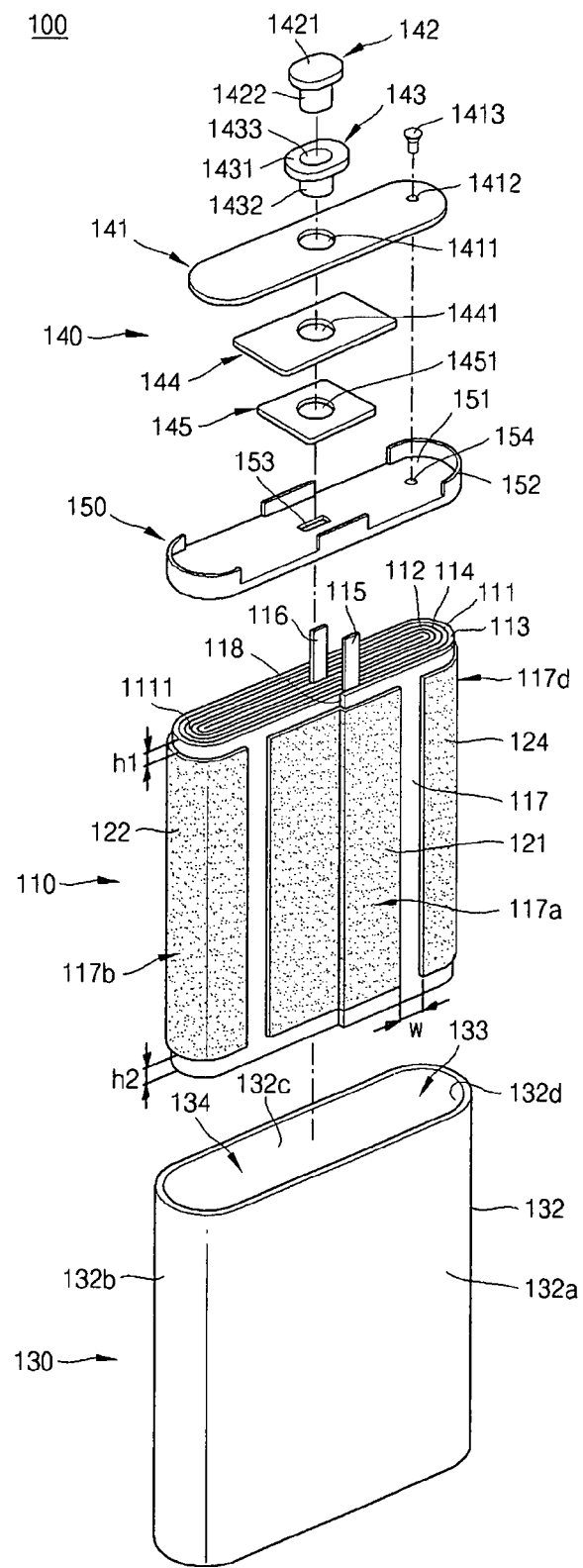
FIG. 2 is an exploded perspective view of the second battery of FIG. 1.

Referring to FIGS. 1 and 2, a secondary battery 100 is of a square type, and includes an electrode assembly 110, a plurality of finishing tapes 121, 122, 123, and 124, a can 130, a cap assembly 140, and an insulation case 150.

Figure 3:
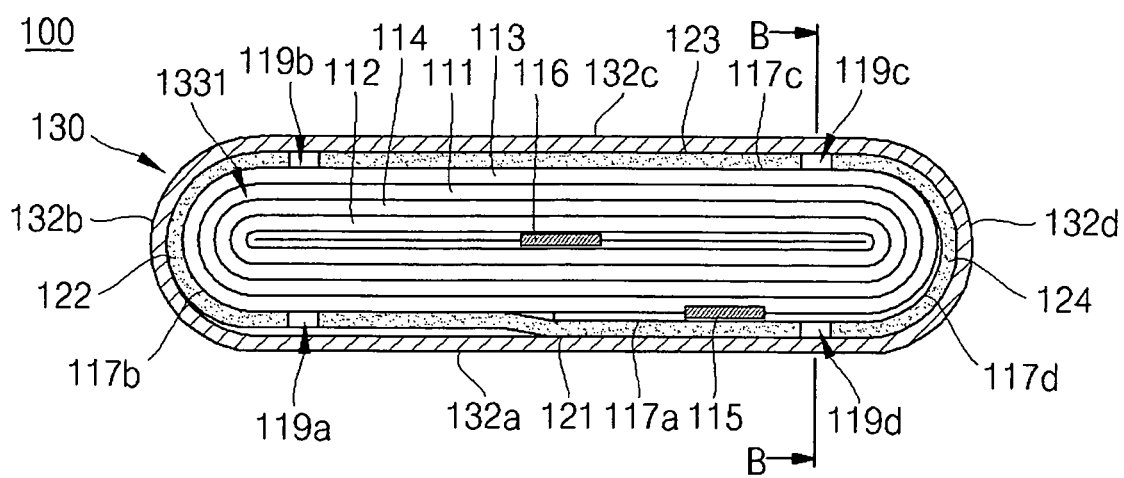
FIG. 3 is a cross-sectional view taken along line A-A of FIG. 1.

Referring to FIGS. 2 and 3, the electrode assembly 110 includes a first electrode plate 111, i.e. a positive electrode plate, a second electrode plate 112, i.e. a negative electrode plate, first and second separators 113 and 114, a first electrode tab 115, i.e. a positive electrode tab, and a second electrode tab 116, i.e. a negative electrode tab. In the electrode assembly 110, the first separator 113, the positive electrode plate 111, the second separator 114, and the negative electrode plate 112 are sequentially stacked forming a stack of the electrodes and separators. The stack of the electrodes and separators is wound about a first edge of the stack. Therefore, a winding direction is a direction perpendicular to the first edge of the stack. As the stack is wound about the first edge of the stack, a second edge 118 of the stack is located at an outer surface 117 of the electrode assembly 110. The outer surface 117 is surfaces of the electrode assembly that are substantially parallel to the first edge of the stack. The outer surface 117 of the electrode assembly 110 is pressed to form a flat plate-like square shape as illustrated in FIG. 2.

The outer surface 117 of the electrode assembly 110 includes a front surface 117a, a first side surface 117b, a rear surface 117c, and a second side surface 117d. The front surface 117a and the rear surface 117c are substantially flat surfaces, and the width of each of the front surface 117a and the rear surface 117c is larger than the width of each of the first side surface 117b and second side surface 117d. Herein, a width is defined as a circumferential size along the winding direction, while a length is defined as a size along the first edge of the stack about which the stack is wound. Each of the first side surface 117b and the second side surface 117d connects the front surface 117a to the rear surface 117d, and has substantially round surface.

The second edge 118 of the stack of the electrode plates 111 and 112 and the separators 113 and 114 is formed on the outer surface 117 of the electrode assembly 110. A first finishing tape 121 is attached to cover the second edge 118 so that the two electrode plates 111 and to 112 and the two separators 113 and 114 cannot be released. In the embodiment of the present invention, the second edge 118 of the stack is located on the front surface 117a, but the present invention is not limited thereto.

In the drawings, the two electrode plates 111 and 112 and the two separators 113 and 114 are illustrated thicker than the actual parts, which is only for convenience sake. In other words, the actual parts are thin films that are much thinner than the illustrated parts.

The positive electrode plate 111 includes a positive electrode collector and a positive electrode active material layer. The positive electrode collector is generally formed with a layer of a conductive metal such as aluminum. The positive electrode active material layer includes a lamellar compound consisting of lithium, a conductive material improving conductivity, and a binder improving the coupling force between the lamellar compound and the conductive material. The positive electrode active material layer is formed on a wide surface of the positive electrode collector so as to be coupled to the positive electrode collector. The positive electrode tab 115 is attached to the positive electrode collector and extends to an upper portion of the electrode assembly 110.

The negative electrode plate 112 includes a negative electrode collector and a negative electrode active material layer. The negative electrode collector is generally formed with a layer of a conductive metal such as copper. The negative electrode active material layer includes a carbon material such as graphite and a binder improving the coupling force between carbon particles. The negative electrode active material layer is formed on a wide surface of the negative electrode collector so as to be coupled to the negative electrode collector. The negative electrode tab 116 is attached to the negative electrode collector and extends to an upper portion of the electrode assembly 110.

The second separator 114 is interposed between the positive electrode plate 111 and the negative electrode plate 112 to insulate the positive electrode plate 111 from the negative electrode plate 112. The first separator 113 is formed on another surface of the positive electrode plate 111 in a manner that the positive electrode plate 111 is disposed between the first and second separators 113 and 114. Minute pores are formed in the two separators 113 and 114, and lithium ions move between the positive electrode plate 111 and the negative electrode plate 112 through the pores. The two separators 113 and 114 may be made of a polymer resin such as polyethylene (PE) and polypropylene (PP).

The positive electrode tab 115 is coupled to the positive electrode collector of the positive electrode plate 111 by ultrasonic welding or resistance welding, and extends to an upper portion of the electrode assembly 110. The positive electrode tab 115 is electrically connected to a cap plate of a cap assembly 140 that will be described in detail later. The positive electrode tap 115 is made of a conductive metal material such as nickel, copper, or aluminum.

The negative electrode tab 116 is coupled to the negative electrode collector of the negative electrode plate 112 by ultrasonic welding or resistance welding, and extends to an upper portion of the electrode assembly 110. The negative electrode tab 116 is electrically connected to an electrode terminal of the cap assembly 140 that will be described in detail later. The negative electrode tap 116 is made of a conductive metal material such as nickel, copper, or aluminum.

The first, second, third, and fourth finishing tapes 121, 122, 123, and 124 are separated from each other along the winding direction of the electrode assembly 110. The first finishing tape 121 is attached to the front surface 117a of the outer surface 117 of the electrode assembly 110, and covers the second edge 118 of the stack of the electrode assembly 110. The electrodes and separators of the electrode assembly 110 are not released or separated due to the first finishing tape 121. The first finishing tape 121 makes contact with a first wide side wall 132a of a can 130 that will be described in detail later to protect the electrode assembly 110 in the can 130. The second finishing tape 122 is attached to the first side surface 117b of the outer surface 117 of the electrode assembly 110. The second finishing tape 122 makes contact with a first narrow side wall 132b of the can 130 to protect the electrode assembly 110 in the can 130. The third finishing tape 123 is attached to the rear surface 117c of the outer surface 117 of the electrode assembly 110. The third finishing tape 123 makes contact with a second wide side wall 132b of the can 130 to protect the electrode assembly 110 in the can 130. The fourth finishing tape 124 is attached to the second side surface 117d of the outer surface 117 of the electrode assembly 110. The fourth finishing tape 124 makes contact with a second narrow side wall 132d of the can 130 to protect the electrode assembly 110 in the can 130.

Figure 4:
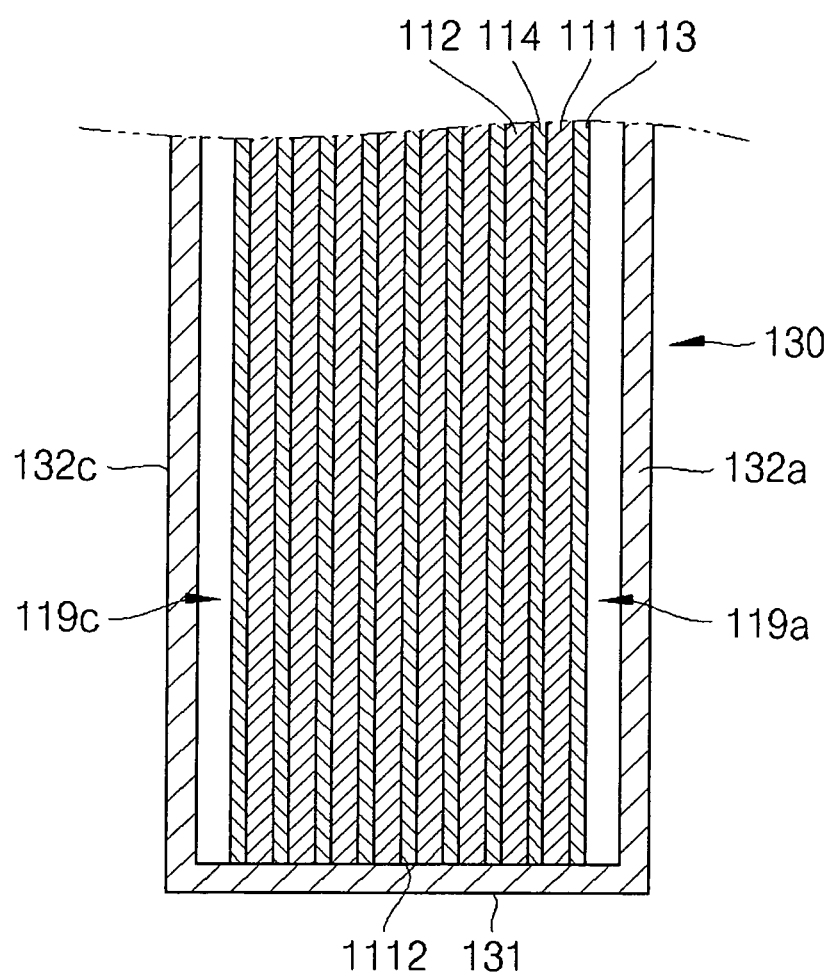
FIG. 4 is a cross-sectional view taken along line B-B of FIG. 3.

Referring to FIGS. 3 and 4, the finishing tapes 121, 122, 123, and 124 are space apart from each other. In this case, first to fourth passages 119a, 119b, 119c, and 119d are formed between adjacent pairs of finishing tapes 121, 122, 123, and 124. The first passage 119a is formed between the first finishing tape 121 and the second finishing tape 122. The second passage 119b is formed between the second finishing tape 122 and the third finishing tape 123. The third passage 119c is formed between the third finishing tape 123 and the fourth finishing tape 124. The fourth passage 119d is formed between the fourth finishing tape 124 and the first finishing tape 121. The passages 119a, 119b, 119c, and 119d linearly extend from the upper end 1111 to the lower end 1112 of the electrode assembly 110.

As shown in FIG. 2, the upper end 1111 and the lower end 1112 of the electrode assembly 10 are the end portions that are substantially perpendicular to the first edge of the stack of the electrode assembly 110. Some portions of the outer surface 117 of the electrode assembly 110 are exposed through the passages 119a, 119b, 119c, and 119d. The heat generated in the electrode assembly 110 dissipates through the exposed portions.

The total widths of the passages 119a, 119b, 119c, and 119d are preferably more than 3% of the circumference of the electrode assembly 110 in order to ensure smooth movement of the electrolyte. The upper ends of the finishing tapes 121, 122, 123, and 124 are spaced apart downward from the upper end of the electrode assembly 110 by a predetermined interval h1. The lower ends of the finishing tapes 121, 122, 123, and 124 are spaced apart upward from the lower end of the electrode assembly 110 by a predetermined interval h2. This structure increases the exposed area of the outer surface 117 of the electrode assembly 110, thereby increasing the flow rate of the electrolyte.

The finishing tapes 121, 122, 123, and 124 make contact with the electrolyte filled inside the can 130. The finishing tapes 121, 122, 123, and 124 are made of a material of high durability over the electrolyte. Accordingly, the finishing tapes 121, 122, 123, and 124 are preferably made of one of polyethylene (PE), polyphenylene ether (PPE), polyimide (PI), polypropylene (PP), and polyethylene terephthalate (PET).

Referring to FIGS. 2 to 4, the can 130 includes a bottom portion 131 and a side wall 132 extending upward from the bottom portion 131. The side wall 132 includes a first wide side wall 132a, a first narrow side wall 132b, a second wide side wall 132c, and a second narrow side wall 132d. The first wide side wall 132a and the second wide side wall 132c face each other, and the first narrow side wall 132b and the second narrow side wall 132d also face each other. The width of each of two wide side walls 132a and 132c is larger than the width of each of the two narrow side walls 132b and 132d. The two wide side walls 132a and 132c are flat plates extending in parallel to each other. The two narrow side walls 132b and 132d are curved such that they become far away from each other approaching the centers thereof. In other words, the centers of the narrow side walls 132b and 132d have convex shapes. The can 130 has an opening 134, which is a pass to the inner space 133 of the can 130, opposite the bottom portion 131. The electrode assembly 110 is inserted into the inner space 133 of the can 130 through the opening 134. The can 130 is made of a conductive metal such as aluminum.

The cap assembly 140 includes a cap plate 141, an electrode terminal 142, an insulation gasket 143, an insulation plate 144, and a terminal plate 145. The cap plate 141 has a plate-like shape corresponding to the opening 134 of the can 130. The cap plate 141 is coupled to the can 130 so as to block the opening 134 of the can 130. In this case, the cap plate 141 and the can 130 may be coupled to each other by welding such as laser welding at their portions that make contact with each other. The cap plate 141 has a first hole 1411 for an electrode terminal that is located substantially at a central portion thereof, and an electrolyte injection hole 1412 located substantially at an end portion thereof. The insulation gasket 143 is inserted into the hole 1411 for an electrode terminal. The electrolyte is injected through the electrolyte injection hole 1412. The electrolyte injection hole 1412 is plugged by a plug 1413 after injection of the electrolyte. The plug may be sealed to the cap plate 141 by laser welding. The cap plate 141 may be made of a conductive metal such as aluminum or an alloy containing aluminum.

The insulation gasket 143 includes a head portion 1431 and an extension portion 1432 extending from the head portion 1431. The insulation gasket 143 has an insertion hole 1433 passing through the center thereof along the extension direction of extension portion 1432. The head portion 1431 is larger than the hole 1411 so as not to pass through the hole 1411. The extension portion 1432 is inserted into the hole 1411 to plug the hole 1411 for an electrode terminal 142. A connecting portion 1422 of the electrode terminal 142, which will be described in detail later, passes through the insertion hole 1433. The insulation gasket 143 is made of an insulation material such a polymer resin and insulates the electrode terminal 142 from the cap plate 141.

The electrode terminal 142 includes a head portion 1421 and a connecting portion 1422 extending from the head portion 1421. The head portion 1421 is larger than the insertion hole 1433 of the insulation gasket 143 so as not to pass through the insertion hole 1433. The head portion 1421 of the electrode terminal 142 is located on the head portion 1431 of the insulation gasket 143. The free end of the connecting portion 1422 is expanded after the connecting portion 1422 passes through the insertion hole 1433 of the insulation gasket 143. The electrode terminal 142 is made of a conductive material such as nickel or an alloy containing nickel.

The insulation plate 144 has a substantially plate-like shape and has a second hole 1441 located substantially at a central portion thereof. A connecting portion 1422 of the electrode terminal 142 passes through the second hole 1441. The insulation plate 144 is located beneath the cap plate 141 and insulates the terminal plate 145 from the cap plate 141 that are prevented from making contact with each other. The insulation plate 144 may be made of a polymer resin.

The terminal plate 145 has a plate-like shape smaller than the insulation plate 144 and has a third hole 1451 located substantially at a central portion thereof. The connecting portion 1422 of the electrode terminal 142 passes through the third hole 1451. After the connecting portion 1422 of the electrode terminal 142 passes through the third hole 1451 of the terminal plate 145, its end is pressed so as to have a diameter larger than the third hole 1451. The terminal plate 145 may be made of a conductive metal such as nickel or an alloy containing nickel. The terminal plate 145 is electrically connected to a negative electrode tab 116 of the electrode assembly 110.

The insulation case 150 is made of an insulation material such as a polymer resin, and includes a bottom plate 151 and a side wall 152 extending from the bottom plate 151. The bottom plate 151 is located on the electrode assembly in the inner space 133 of the can 130. The bottom plate 151 has a shape substantially corresponding to the opening 134 of the can 130. The bottom plate 151 includes a slit 153, a second slit (not shown), and an electrolyte passage hole 154. The negative electrode tab 116 of the electrode assembly 110 passes through the first slit 153 to be electrically connected to the electrode terminal 142 of the cap assembly 140. The positive electrode tab 115 of the electrode assembly 110 passes through the second slit (not shown) so as to be electrically connected to the cap plate 141 of the cap assembly 140. The side wall 152 extends from the periphery of the bottom plate 151, and contacts the inner wall surface of the can 130. The side wall 152 improves the strength of the bottom plate 151 and prevents the insulation case 150 from moving in the inner space of the can 130.

Referring now to FIGS. 2 to 4, the operation of a secondary battery according to the embodiment of the present invention will be described in detail. During the manufacturing process of the secondary battery, the electrolyte is injected through the electrolyte injection hole 1412 of the cap plate 141. The injected electrolyte flows through the electrolyte passage hole 154 formed in the insulation case 150, and is introduced into the inner space 133 of the can 130. The electrolyte introduced into the inner space 133 of the can 130 flows into the electrode assembly 110 through the upper end 1111 of the electrode assembly 110 to be filled in the electrode assembly 110.

At the same time, a considerable amount of electrolyte flows down toward the bottom 131 of the can 130 through the passages 119a, 119b, 119c, and 119d formed between the finishing tapes 121, 122, 123, and 124. The electrolyte flowing down toward the bottom 131 of the can 130 is filled from the lower end 1112 of the electrode assembly 110. In other words, a considerable amount of electrolyte can be filled from the lower end 1112 as well as the upper end 1111 of the electrode assembly 110, thereby making the filling rate of the electrolyte higher. Accordingly, the productivity of the battery is improved. The heat generated in the electrode assembly 110 during the charging operation of the battery dissipates through the passages 119a, 119b, 119c, and 119d, thereby enhancing the heat dissipation effect and improving the efficiency of the battery. As the finishing tapes 121, 122, 123, and 124 are spaced apart from each other, the pressure applied to the electrode assembly 20 is reduced preventing the deformation of the electrode assembly.

The four exposed portions are formed around the electrode assembly in the first embodiment of the present invention, but the present invention is not limited thereto. In other words, more than or less than four exposed portions may be formed.

Figure 5:
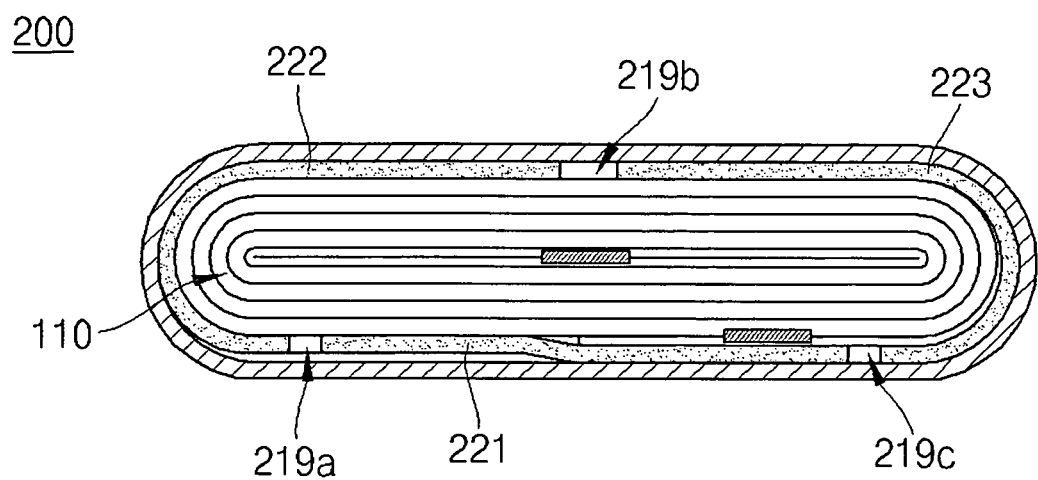
FIG. 5 is a cross-sectional view illustrating the internal structure of a square type lithium ion secondary battery according to another embodiment of the present invention.

FIG. 5 illustrates a battery according to the second embodiment of the present invention that has three exposed portions. Referring to FIG. 5, the secondary battery 200 includes an electrode assembly 110, and three finishing tapes 221, 222, and 223 attached to an electrode assembly 110. First, second, and third passages 219a, 219b, and 219c are formed between two adjacent finishing tapes 221, 222, and 223. The electrode assembly 110 of the second embodiment is the same as the electrode assembly of the first embodiment, and therefore, detailed descriptions of the electrode assembly 110 of the second embodiment are omitted. The structure and operation other than the number of finishing tapes and passages are the same as those of the first embodiment of the present invention, in which case detailed description thereof will be omitted.

The upper and lower ends of the finishing tapes are spaced apart from the upper and lower ends of the electrode assembly in the first embodiment of the present invention, but the present invention is not limited thereto.

Figure 6:
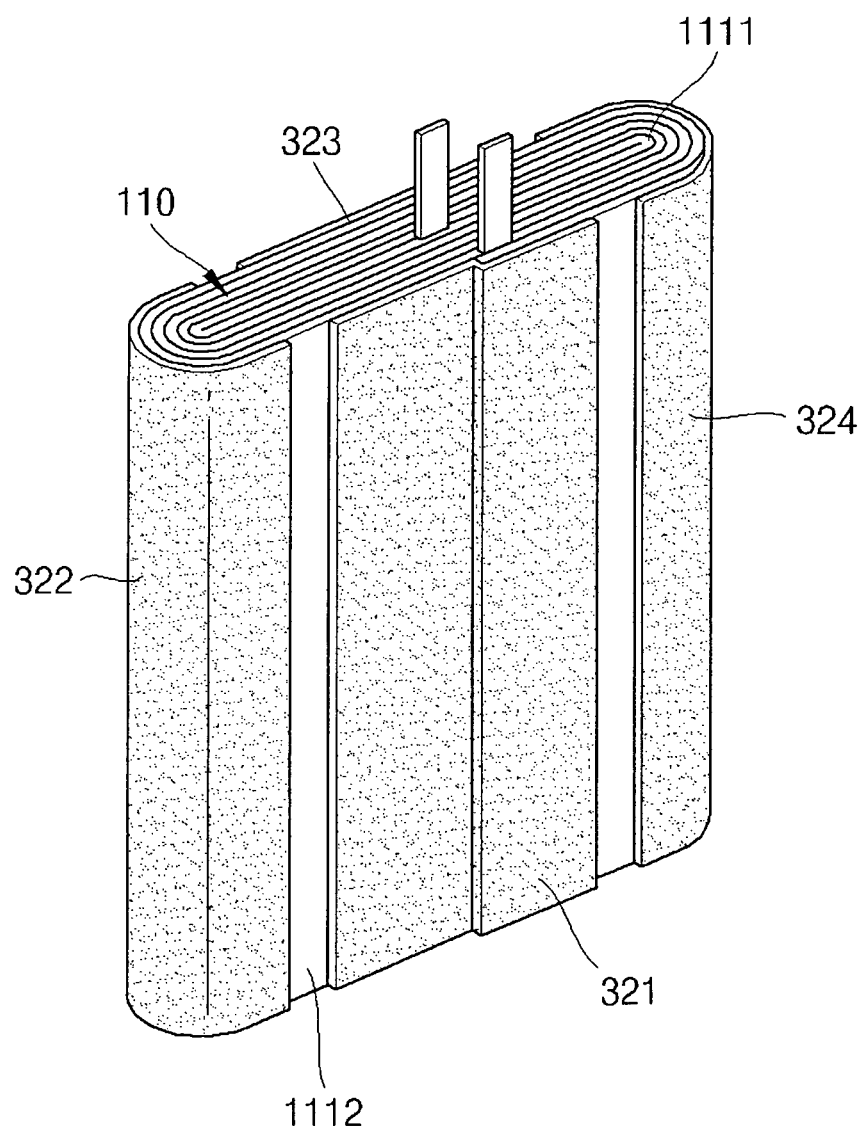
FIG. 6 is a perspective view illustrating an electrode assembly of a square type lithium ion secondary battery according to still another embodiment of the present invention to which a finishing tape is attached.

Referring to FIG. 6 illustrating the secondary battery according to the third embodiment of the present invention, the upper and lower ends of the finishing tapes 321, 322, 323, and 324 are substantially the same levels as the upper end and lower ends 1111 and 1112 of the electrode assembly 110. In addition, unlike the first embodiment and the third embodiment of the present invention that are illustrated in FIGS. 2 and 6, the upper ends of some finishing tapes may be spaced apart from the upper end of the electrode assembly, and the lower ends of only some finishing tapes may be space apart from the lower end of the electrode assembly.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery comprising:
an electrode assembly in which a first electrode plate, a separator, and a second electrode plate are sequentially stacked and wound; and
a plurality of finishing tapes attached to the outer surface of the electrode assembly and sequentially spaced apart from each other along the winding direction of the electrode assembly, the outer surface of the electrode assembly including a front surface, a rear surface, a first side surface and a second side surface along a direction parallel to the winding direction, the first and the second side surfaces connecting the front surface to the rear surface, each of the front surface and the rear surface has a width wider than a width of each of the first side surface and the second side surface, the plurality of the finishing tapes including at least four finishing tapes, a first one of the finishing tapes being attached on the front surface of the electrode assembly, a second one of the finishing tapes on the rear surface of the electrode assembly, a third one of the finishing tapes on the first side surface of the electrode assembly, a fourth one of the finishing tapes on the second side surface of the electrode assembly, the first, second, third and forth ones of the finishing tapes being spaced apart from each other, the third one of the finishing tapes completely covering the first side surface of the electrode assembly.

2. The secondary battery of claim 1, wherein passages are formed between two of the finishing tapes.

3. The secondary battery of claim 2, wherein the passages linearly extend from an upper end to a lower end of the electrode assembly along a direction perpendicular to the winding direction.

4. The secondary battery of claim 3, wherein total widths of the passages are equal to or more than 3% of a circumference of the electrode assembly along a direction parallel to the winding direction.

5. The secondary battery of claim 1, wherein at least one of the finishing tapes covers a second edge of the stack of the electrode assembly.

6. The secondary battery of claim 1, wherein the second edge of the stack of the electrode assembly is located on the front surface.

7. The secondary battery of claim 1, wherein the electrode assembly includes a first electrode tab attached to the first electrode plate and a second electrode tab attached to the second electrode plate.

8. The secondary battery of claim 1, further comprising a can housing the electrode assembly.

9. The secondary battery of claim 8, wherein the plurality of finishing tapes contacts side walls of the can.

10. The secondary battery of claim 9, further comprising an insulation case disposed inside the can, the insulation case including a bottom plate covering an upper portion of the electrode assembly, the bottom plate of the insulation plate having a passage hole through which electrolyte is injected.

11. The secondary battery of claim 1, wherein an upper end of at least one of the finishing tapes, which is formed parallel to the winding direction, is spaced apart downward from an upper end of the electrode assembly.

12. The secondary battery of claim 1, wherein a lower end of at least one of the finishing tapes, which is formed parallel to the winding direction, is spaced apart upward from a lower end of the electrode assembly.

13. The secondary battery of claim 1, wherein the first electrode plate, the separator, and the second electrode plate of the electrode assembly are sequentially stacked forming a stack and the stack is wound about a first edge of the stack, finishing tapes being spaced apart from each other along a direction substantially perpendicular to the first edge.

14. A secondary battery comprising:
an electrode assembly in which a first electrode plate, a separator, and a second electrode plate are sequentially stacked forming a stack and the stack is wound about a first edge of the stack; and
a plurality of finishing tapes attached to an outer surface of the electrode assembly and spaced apart from each other, an end of at least one of finishing tapes being substantially the same level as an end of the electrode assembly, the outer surface of the electrode assembly including a front surface, a rear surface, a first side surface and a second side surface along a direction parallel to the winding direction, the first and the second side surfaces connecting the front surface to the rear surface, each of the front surface and the rear surface has a width wider than a width of each of the first side surface and the second side surface, the plurality of the finishing tapes including at least four finishing tapes, a first one of the finishing tapes being attached on the front surface of the electrode assembly, a second one of the finishing tapes on the rear surface of the electrode assembly, a third one of the finishing tapes on the first side surface of the electrode assembly, a fourth one of the finishing tapes on the second side surface of the electrode assembly, the first, second, third and forth ones of the finishing tapes being spaced apart from each other, the third one of the finishing tapes completely covering the first side surface of the electrode assembly.

15. The secondary battery of claim 14, wherein another end of the at least one of the finishing tapes is substantially the same level as another end of the electrode assembly.

16. The secondary battery of claim 14, wherein the finishing tapes are spaced apart from each other along a direction substantially perpendicular to the first edge.

17. The secondary battery of claim 14, wherein passages are formed between two of the finishing tapes.

18. The secondary battery of claim 17, wherein total widths of the passages are equal to or more than 3% of a circumference of the electrode assembly along a direction substantially perpendicular to the first edge.

19. The secondary battery of claim 1, wherein the finishing tapes being made of polyethylene (PE), polyphenylene ether (PPE), polyimide (PI), polypropylene (PP), or polyethylene terephthalate (PET).

20. The secondary battery of claim 14, wherein the finishing tapes being made of polyethylene (PE), polyphenylene ether (PPE), polyimide (PI), polypropylene (PP), or polyethylene terephthalate (PET).

* * * * *